United States Patent
Takada et al.

(10) Patent No.: US 7,904,022 B2
(45) Date of Patent: Mar. 8, 2011

(54) SUPPORT APPARATUS FOR READING TAG INFORMATION AND METHOD THEREFOR

(75) Inventors: Masatoshi Takada, Hitachi (JP); Kenji Araki, Mito (JP); Kenji Akagi, Hitachi (JP); Koichi Murayama, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 1144 days.

(21) Appl. No.: 11/543,800

(22) Filed: Oct. 6, 2006

(65) Prior Publication Data

US 2007/0205870 A1 Sep. 6, 2007

(30) Foreign Application Priority Data

Oct. 11, 2005 (JP) ................. 2005-296090

(51) Int. Cl.
*H04B 7/00* (2006.01)
(52) U.S. Cl. ....... 455/41.2; 455/41.1; 455/517; 455/518; 340/10.1; 340/10.2
(58) Field of Classification Search ............... 455/41.2, 455/41.1, 517, 518; 340/10.1, 10.2
See application file for complete search history.

(56) References Cited

U.S. PATENT DOCUMENTS

| | | | | |
|---|---|---|---|---|
| 6,963,277 | B2 * | 11/2005 | Imasaki et al. | 340/539.1 |
| 2006/0071754 | A1 * | 4/2006 | Tofts et al. | 340/5.22 |
| 2008/0030335 | A1 * | 2/2008 | Nishida et al. | 340/572.1 |

FOREIGN PATENT DOCUMENTS

JP 2004-102749 4/2004

\* cited by examiner

*Primary Examiner* — Tuan H Nguyen
(74) *Attorney, Agent, or Firm* — Antonelli, Terry, Stout & Kraus, LLP.

(57) ABSTRACT

To support a tag information reader to read information from radio communication tags, attached to each of a plurality of structural objects in a plant and to provide the locations of unread radio communication tags, a tag information acquisition unit acquires information on radio communication tags actually read by the tag information reader. Next, an unread tag extraction unit extracts radio communication tags which are a plurality of radio communication tags stored in a tag arrangement data file but from which information cannot be acquired by the tag information acquisition unit, and an unread tag arrangement calculation unit acquires arrangement data on the extracted radio communication tags. The arrangement data on those radio communication tags is sent to a display unit for displaying the radio communication tags.

3 Claims, 13 Drawing Sheets

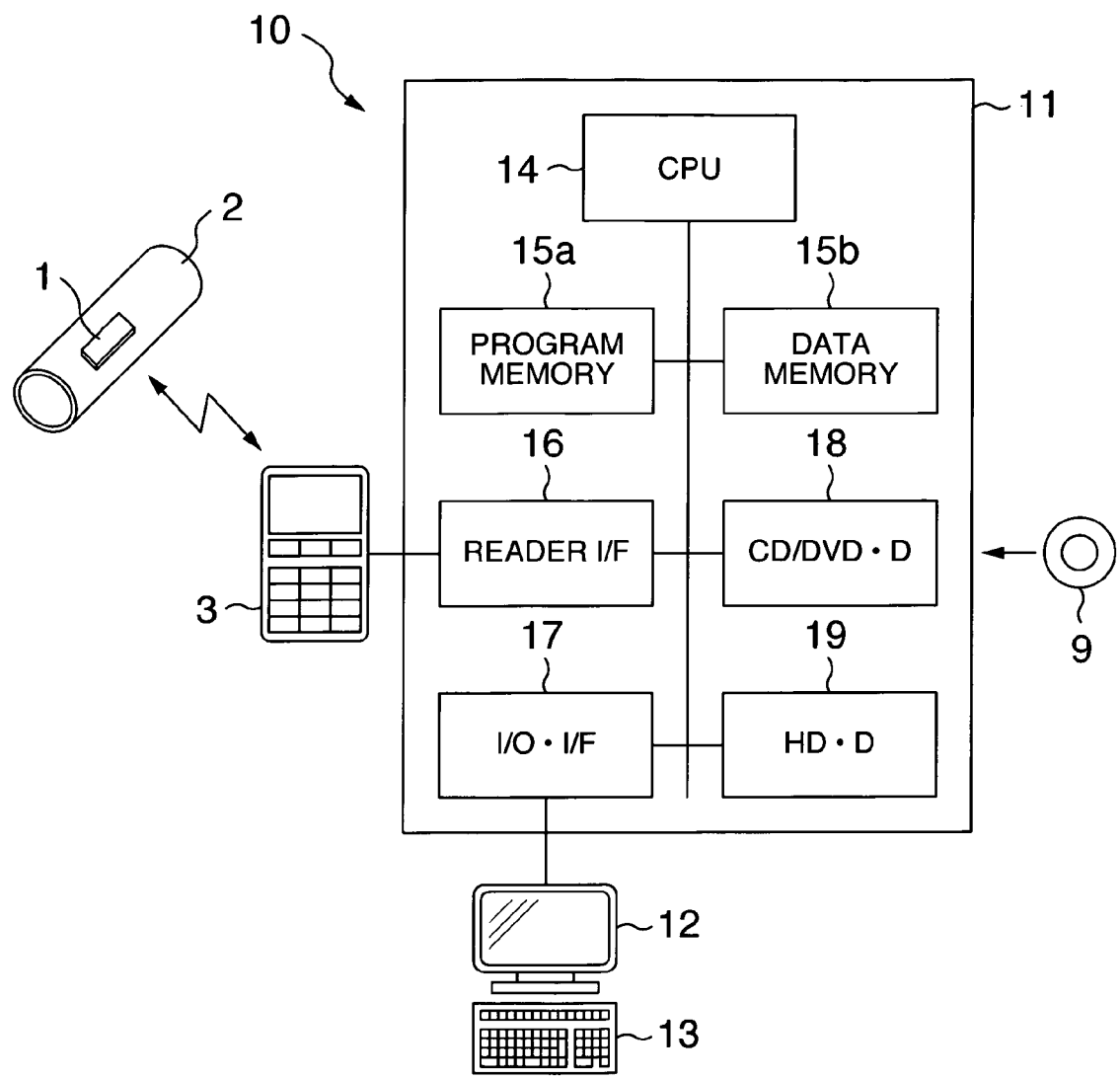

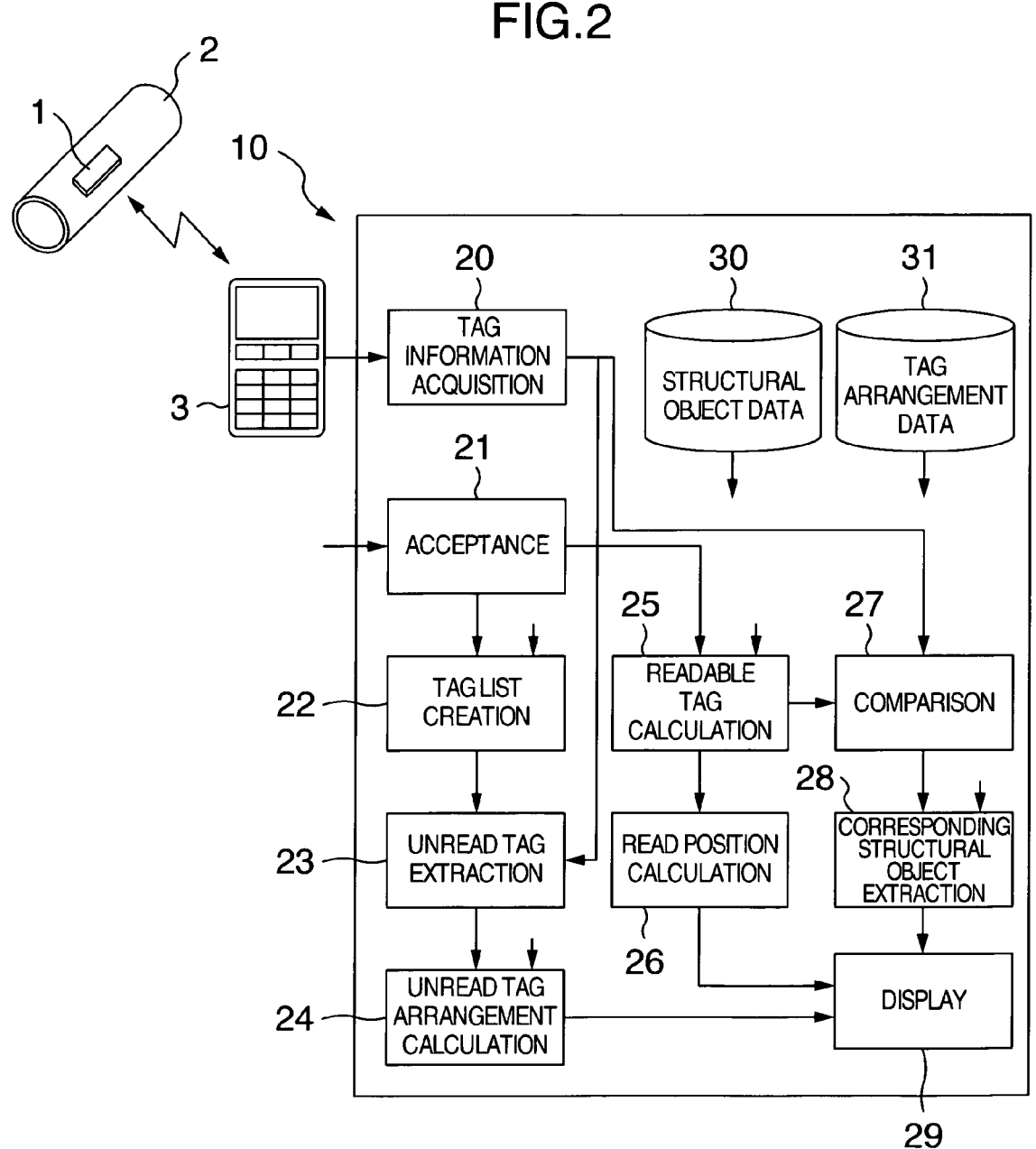

FIG.3A

| PARENT STRUCTURAL OBJECT ID | TYPE | CHILD STRUCTURAL OBJECT CHECK | CHILD STRUCTURAL OBJECT ID |
|---|---|---|---|
| N1D-012A-58 | PIPE ASSEMBLY | FINISHED | 5L3G240-105-5,5L3G240-105-6 |
| GT00001A | SUPPORT | FINISHED | GT00001A-1,GT00001A-2,GT00001A-3, GT00001A-4,GT00001A-5 |
| T1B11M001 | MODULE | — | N1D-012A-58,N1D-012A-60,GT00001A, 1N15-F00001A |
| TB1001 | IN-AREA STRUCTURAL OBJECT | — | TB1001M001,N2D-001A-11,N3D-001A-20 |

| STRUCTURAL OBJECT ID | TYPE | SIZE | SHAPE DATA |
|---|---|---|---|
| 5L3G240-105-5 | STRAIGHT PIPE | 150φ | P0(15000,5000,5000),P1(15000,10000,5000) |
| 5L3G240-105-6 | ELBOW | 150φ | P0(15000,10000,5000),P1(15000,12500,5000) P2(15000,12500,75000) |
| GT00001A-1 | CUBOID | 5000×5000×100 | P0(2000,20000,1000),P1(25000,20000,1000) P2(20000,25000,1000),P4(20000,20000,1100) |

30b

FIG.4
TAG ARRANGEMENT DATA FILE
| STRUCTURAL OBJECT ID | TAG ID | TAG-ATTACHED CHILD STRUCTURAL OBJECT ID | ARRANGEMENT ON STRUCTURAL OBJECT |
|---|---|---|---|
| 5L3G240-105-5 | C1A0112AD30 | 5L3G240-105-5 | (200,0,150) |
| 5L3G240-105-6 | A1F0112AD30 | 5L3G240-105-6 | (100,150,0) |
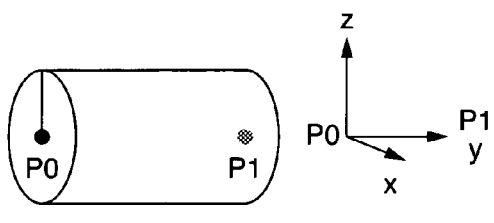
FIG.5A
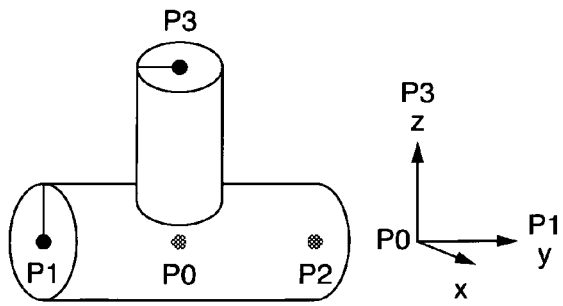
FIG.5C
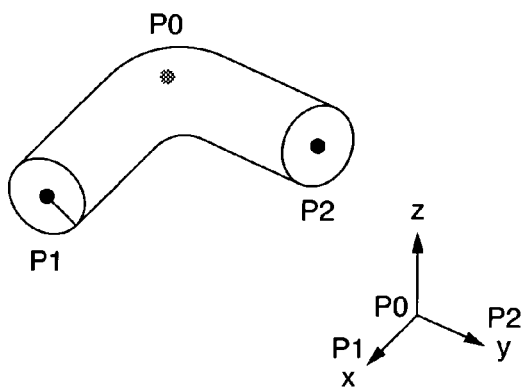
FIG.5B
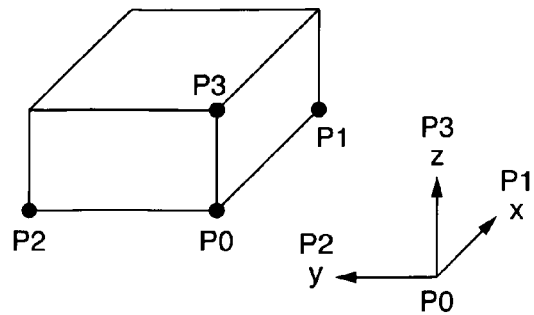
FIG.5D

FIG.13

| READ CANDIDATE POSITION | NUMBER OF READABLE TAGS | READABLE TAG ID |
|---|---|---|
| A | 4 | C1A0112AD30,A1F0112AD30,D5F0112AD30, A150112AD30 |
| B | 2 | A1F0112AD30,D5F0112AD30 |
| C | 3 | D5F0112AD30,A150112AD30,B349012AD30 |
| ... | ... | ... | ic communication tag attached to each of multiple items.
SUPPORT APPARATUS FOR READING TAG INFORMATION AND METHOD THEREFOR

BACKGROUND OF THE INVENTION

The present invention relates to a tag information reading support apparatus, a tag information reading support program, and a tag information reading support method that support a tag information reader to read information from a radio communication tag attached to each of multiple items.

There is an item management method in which radio communication tags, called RFID (Radio Frequency Identification), are attached to the items to allow a tag information reader to read information on the items from the radio communication tags to manage the items.

A technology for using the radio communication tags is disclosed, for example, in JP-A-2004-102749.

The technology disclosed in JP-A-2004-102749 uses information from radio communication tags, attached to the items, to guide workers in in-plant work. This technology provides workers with information such as operation information on apparatuses, in-plant positional relation information on apparatuses, and so on.

SUMMARY OF THE INVENTION

However, the problem with the prior-art technology described above is that, if there is a radio communication tag that cannot be accessed, the information stored in the radio communication tag cannot be provided to the workers and the work is sometimes disturbed. A radio communication tag, which communicates wirelessly with a tag reader, can send information to, and receive information from, a location relatively away from the tag reader but sometimes cannot wirelessly communicate with the tag reader due to the radio transmission distance or an obstacle. In addition, the incorrect installation of an item, to which a radio communication tag is attached, sometimes prevents the tag information reader from wirelessly communicating with a radio communication tag.

In view of the problems with the prior art described above, it is an object of the present invention to provide a tag information reading support apparatus, a tag information reading support program, and a tag information reading support method that provide efficient access to a radio communication tag.

An invention of a tag information reading support apparatus for solving the problems described above resides in a tag information reading support apparatus that supports a tag information reader to read information from radio communication tags attached to each of a plurality of items, comprising:

tag arrangement data storage means in which information on an arrangement of each of the radio communication tags, attached to each of the plurality of items, is stored;

tag information acquisition means that acquires information on the radio communication tags, attached to each of the plurality of items, from the tag information reader;

unread tag extraction means that extracts one or more radio communication tags from the plurality of radio communication tags which are stored in the tag arrangement data storage means but from which information could not be acquired by the tag information acquisition means;

tag arrangement data extraction means that extracts information on an arrangement of the one or more radio communication tags, extracted by the unread tag extraction means, from the tag arrangement data storage means; and output means that outputs information on the arrangement of the radio communication tags extracted by the tag arrangement data extraction means.

Another invention of a tag information reading support apparatus resides in a tag information reading support apparatus that supports a tag information reader to read information from radio communication tags attached to each of a plurality of items, comprising:

candidate acceptance means that accepts one or more read candidate positions at which the tag information reader reads information from a plurality of radio communication tags;

readable tag calculation means that finds radio communication tags, which are among the plurality of radio communication tags and from which information can be read by the tag information reader, at each of the one or more read candidate positions;

read position calculation means that finds, from one or more read candidate positions at which the readable radio communication tags are found by the readable tag calculation means, either a read candidate position at which a number of readable radio communication tags is the highest or read candidate positions that minimize a number of read candidates required to read information from all radio communication tags; and output means that outputs the read candidate positions, which are found by the read position calculation means, as read positions for use by the tag information reader.

A still another invention of a tag information reading support apparatus resides in a tag information reading support apparatus that supports a tag information reader to read information from radio communication tags attached to each of a plurality of items, comprising:

item data storage means in which information on items, to which the radio communication tags are attached, and/or information on an arrangement of the items is stored;

tag information acquisition means that acquires information on the radio communication tags, attached to each of the plurality of items, from the tag information reader;

read position acquisition means that acquires positions at which the information on the radio communication tags is read by the tag information reader;

readable tag calculation means that finds, at the read positions of the tag information reader acquired by the read position acquisition means, radio communication tags which are among a plurality of radio communication tags and from which information can be read;

comparison means that compares one or more radio communication tags, from which information can actually be read at the read positions of the tag information reader acquired by the read position acquisition means, with one or more radio communication tags, which are found by the readable tag calculation means, for finding unmatched radio communication tags;

item extraction means that extracts information on items, to which the radio communication tags found by the comparison means are attached, and/or information on an arrangement of the items from the item data storage means; and output means that outputs the items and/or the arrangement of the items extracted by the item extraction means.

An invention of a tag information reading support program for solving the problems described above resides in a tag information reading support program that supports a tag information reader to read information from radio communication tags attached to each of a plurality of items, the program causing a computer to execute:

a tag information acquisition step that acquires information on the radio communication tags, attached to each of the plurality of items, from the tag information reader;

an unread tag extraction step that extracts one or more radio communication tags from the plurality of radio communication tags of which arrangement information is stored in a tag arrangement data storage area but from which information could not be acquired in the tag information acquisition step;

a tag arrangement data extraction step that extracts information on an arrangement of the one or more radio communication tags, extracted in the unread tag extraction step, from the tag arrangement data storage area; and an output step that outputs information on the arrangement of the radio communication tags extracted in the tag arrangement data extraction step.

An another invention of a tag information reading support program resides in a tag information reading support program that supports a tag information reader to read information from radio communication tags attached to each of a plurality of items, the program causing a computer to execute:

a candidate acceptance step that accepts one or more read candidate positions at which the tag information reader reads information from a plurality of radio communication tags;

a readable tag calculation step that finds radio communication tags, which are among the plurality of radio communication tags and from which information can be read by the tag information reader, at each of the one or more read candidate positions;

a read position calculation step that finds, from one or more read candidate positions at which the readable radio communication tags are found in the readable tag calculation step, either a read candidate position at which a number of readable radio communication tags is the highest or read candidate positions that minimize a number of read candidates required to read information from all radio communication tags; and an output step that outputs the read candidate positions, which are found in the read position calculation step, as read positions for use by the tag information reader.

A still another invention of a tag information reading support program resides in a tag information reading support program that supports a tag information reader to read information from radio communication tags attached to each of a plurality of items, the program causing a computer to execute:

a tag information acquisition step that acquires information on the radio communication tags, attached to each of the plurality of items, from the tag information reader;

a read position acquisition step that acquires positions at which the information on the radio communication tags is read by the tag information reader;

a readable tag calculation step that finds, at the read positions of the tag information reader acquired in the read position acquisition step, radio communication tags which are among a plurality of radio communication tags and from which information can be read;

a comparison step that compares one or more radio communication tags, from which information can actually be read at the read positions of the tag information reader acquired in the read position acquisition step, with one or more radio communication tags, which are found in the readable tag calculation step, for finding unmatched radio communication tags;

an item extraction step that extracts information on items, to which the radio communication tags found in the comparison step are attached, and/or information on an arrangement of the items from an item data storage area; and an output step that outputs the items and/or the arrangement of the items extracted in the item extraction step.

An invention of a tag information reading support method for solving the problems described above resides in a tag information reading support method that supports a tag information reader to read information from radio communication tags attached to each of a plurality of items, comprising:

a step of storing, in advance, information on an arrangement of each of the radio communication tags, attached to each of the plurality of items, in a storage area;

a tag information acquisition step that acquires information on the radio communication tags, attached to each of the plurality of items, from the tag information reader;

an unread tag extraction step that extracts one or more radio communication tags from the plurality of radio communication tags which are stored in the storage area but from which information could not be acquired in the tag information acquisition step;

a tag arrangement data extraction step that extracts information on an arrangement of the one or more radio communication tags, extracted in the unread tag extraction step, from the storage area; and an output step that outputs information on the arrangement of the radio communication tags extracted in the tag arrangement data extraction step.

Another invention of a tag information reading support method resides in a tag information reading support method that supports a tag information reader to read information from radio communication tags attached to each of a plurality of items, comprising:

a candidate acceptance step that accepts one or more read candidate positions at which the tag information reader reads information from a plurality of radio communication tags;

a readable tag calculation step that finds radio communication tags, which are among the plurality of radio communication tags and from which information can be read by the tag information reader, at each of the one or more read candidate positions;

a read position calculation step that finds, from one or more read candidate positions at which the readable radio communication tags are found in the readable tag calculation step, either a read candidate position at which a number of readable radio communication tags is the highest or read candidate positions that minimize a number of read candidates required to read information from all radio communication tags; and an output step that outputs the read candidate positions, which are found in the read position calculation step, as read positions for use by the tag information reader.

A still another invention of a tag information reading support method resides in a tag information reading support method that supports a tag information reader to read information from radio communication tags attached to each of a plurality of items, comprising:

a step of storing, in advance, information on items, to which the radio communication tags are attached, and/or information on an arrangement of the items in a storage area;

a tag information acquisition step that acquires information on the radio communication tags, attached to each of the plurality of items, from the tag information reader;

a read position acquisition step that acquires positions at which the information on the radio communication tags is read by the tag information reader;

a readable tag calculation step that finds, at the read positions of the tag information reader acquired in the read position acquisition step, radio communication tags which are among a plurality of radio communication tags and from which information can be read;

a comparison step that compares one or more radio communication tags, from which information can actually be read at the read positions of the tag information reader acquired in the read position acquisition step, with one or more radio communication tags, which are found in the readable tag calculation step, for finding unmatched radio communication tags;

an item extraction step that extracts information on items, to which the radio communication tags found in the comparison step are attached, and/or information on an arrangement of the items from the storage area; and an output step that outputs the items and/or the arrangement of the items extracted in the item extraction step.

The invention that provides unread tag extraction means gives the operator the information on the presence and position of radio communication tags, which are included in multiple radio communication tags that can be read under ordinary circumstances but which cannot be read, so that the operator can easily and quickly find them. This information allows the operator to understand that the read position of the tag information reader is improper or that the installation of the structural object to which an unread radio communication tag is attached is incorrect.

The invention that provides read position calculation means allows the operator to know the read positions at which information can be efficiently read from many radio communication tags.

The invention that provides the read position calculation means and comparison means allows the operator to quickly and easily check the installation status of many items to which radio communication tags are attached.

Therefore, any of those inventions results in giving the ability to efficiently access many radio communication tags.

Other objects, features, and advantages of the present invention will be made more apparent by the following description of the present invention concerning the attached drawings.

BRIEF DESCRIPTION OF THE DRAWINGS

FIG. 1 is a block diagram showing the circuit of a tag information reading support apparatus in a radio communication tag system in one embodiment of the present invention.

FIG. 2 is a functional block diagram showing the tag information reading support apparatus in the radio communication tag system in one embodiment of the present invention.

FIGS. 3A and 3B are diagrams showing the configuration of structural object data files in one embodiment of the present invention wherein FIG. 3A shows the configuration of a structural object parent-child data file and FIG. 3B shows the configuration of a structural object arrangement data file.

FIG. 4 is a diagram showing the configuration of a tag arrangement data file in one embodiment of the present invention.

FIGS. 5A-5D are diagrams showing the representative points and the proper coordinate system of child structural objects in one embodiment of the present invention.

FIG. 13 is a diagram showing the configuration of a readable tag management table in one embodiment of the present invention.

DESCRIPTION OF THE EMBODIMENTS

Figure 6:
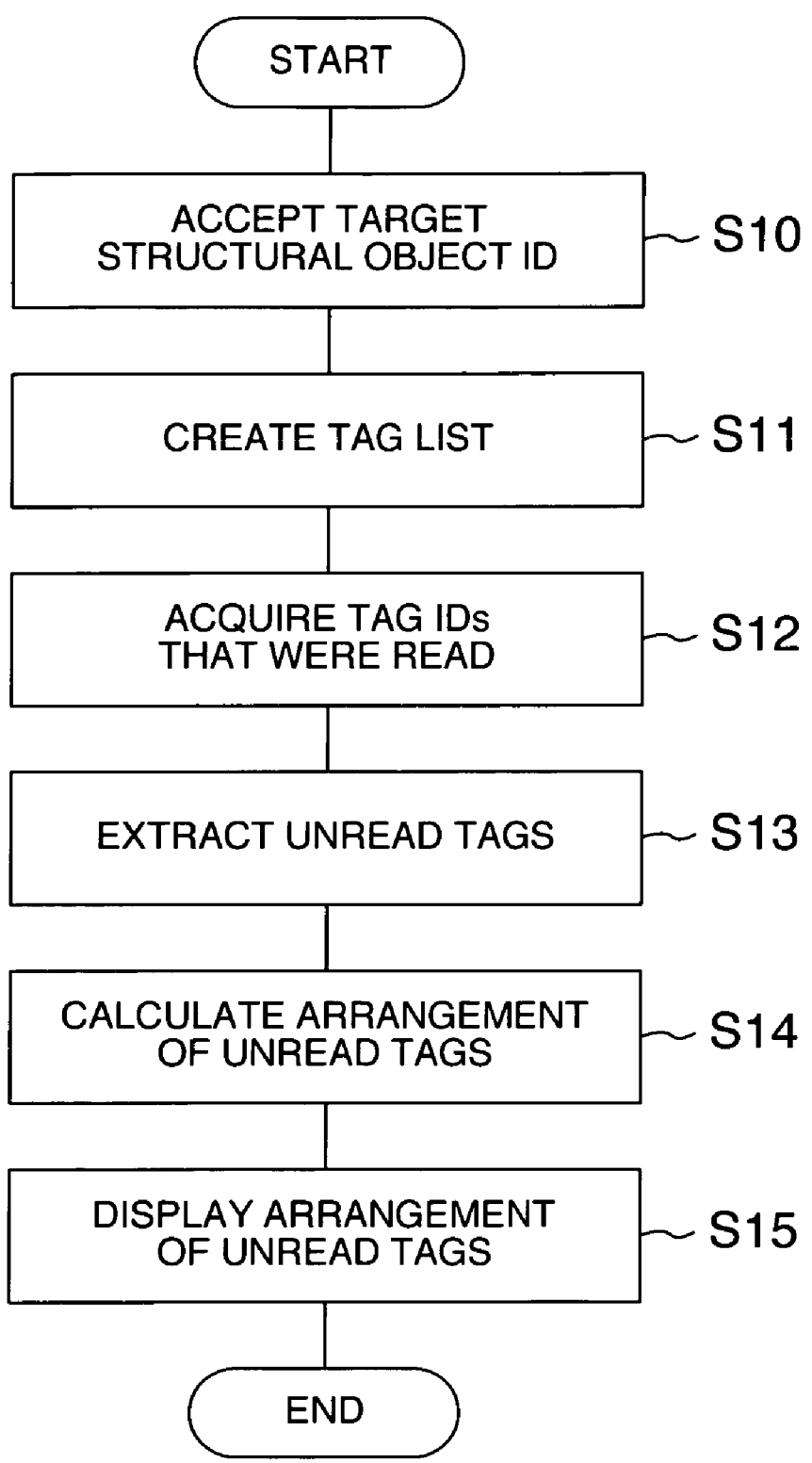
FIG. 6 is a flowchart showing the procedure of unread tag check processing in one embodiment of the present invention.

A radio communication tag system according to the present invention will be described below with reference to the drawings.

A radio communication tag system in this embodiment is a system for managing various types of structural objects (items) in a plant, for example, equipment such as pipes, reactor vessels, and pumps. As shown in FIG. 1, this radio communication tag system comprises a radio communication tag 1 attached to each structural object 2 in a plant, a tag information reader 3 that reads information from the radio communication tag 1, a tag information reading support apparatus 10 that supports the tag information reader 3 to read tag information.

There are two types of radio communication tag 1: one is a passive type that converts a part of the radio wave from the tag information reader 3 to an electric power for use as the driving power and the other is an active type that has a battery and uses the electric power of this battery as the driving power. Any type of radio communication tag may be used in this system. The radio communication tag 1 has an electrically readable/rewritable nonvolatile memory such as a NAND flash ROM, in which the ID of this radio communication tag 1, the ID of the structural object to which this radio communication tag 1 is attached, the specifications of this structural object, the inspection result of this structural object, and the maintenance history of this structural object are stored.

The tag information reader 3 wirelessly communicates with the radio communication tag 2 and reads information from the radio communication tag 2 within the distance range, and within the communication angle range, defined by the specification of this tag information reader. The tag information reader 3 may be a reader that can not only read information from the radio communication tag 2 but also write information into the radio communication tag 2.

The tag information reading support apparatus 10 comprises a computer main board 11, a display 12 that is an output device, and a keyboard 13 that is an input device. The output device, though a display in this embodiment, may be a speaker or a printer instead of the display. The computer main board 11 comprises a CPU 14 that executes various types of operations, a program memory 15a in which the programs executed by the CPU 14 are stored, a data memory 15b in which various types of data are stored, a reader interface 16 via which data is obtained from the tag information reader 3, an I/O interface 17 via which a signal is sent to or received from the display 12 or the keyboard 13, a CD/DVD drive 18 that reads a CD or DVD 9 on which programs are stored, and a hard disk drive 19.

As shown in FIG. 2, the tag information reading support apparatus 10 functionally comprises the following components: a structural object data file 30 in which data on the structural objects 2 is stored, a tag arrangement data file 31 in which arrangement data on the radio communication tags 2 is stored, a tag information acquisition unit 20 that acquires tag information, stored in the radio communication tag 1, from the tag information reader 3, an acceptance unit 21 that accepts an instruction or data from an operator and so on (hereinafter simply called an operator), a tag list creation unit 22 that creates a list of radio communication tags attached to the structural objects 2, an unread tag extraction unit 23 that extracts radio communication tags which are stored in the tag list but from which information could not be acquired, an unread tag arrangement calculation unit 24 that produces information on the arrangement of the extracted radio communication tags, a readable tag calculation unit 25 that calculates readable radio communication tags from specified read positions or read candidate positions, a read position calculation unit 26 that calculates the read candidate position that minimizes the number of read positions required to read information from all radio communication tags, a comparison unit 27 that compares one or more radio communication tags from which information could actually be read at specified read positions with one or more radio communication tags calculated by the readable tag calculation unit 25 to find unmatched radio communication tags, a corresponding structural object extraction unit 28 that extracts from the structural object data file 30 the information on a structural object to which a radio communication tag obtained by the comparison unit 27 is attached and the information on the arrangement of this structural object, and a display unit 29.

Out of the functional components described above, the structural object data file 30 and the tag arrangement data file 31 are configured to have the hard disk drive 19 shown in FIG. 1. All of the tag list creation unit 22, unread tag extraction unit 23, unread tag arrangement calculation unit 24, readable tag calculation unit 25, read position calculation unit 26, comparison unit 27, and corresponding structural object extraction unit 28 are configured to have the program memory 15a and the CPU 14, which executes the programs stored in this program memory 15a, shown in FIG. 1. The tag information acquisition unit 20 has the reader interface 16, the acceptance unit 21 has the I/O interface 17 and the keyboard 13, and the display unit 29 has the display 12 and the I/O interface 17 and, in addition, those components are configured to have the program memory 15a and the CPU 14.

As shown in FIGS. 3A-3B, the structural object data file 30 has two files: one is a structural object parent-child data file 30a indicating the relation between a parent structural object of a structural object and the multiple child structural objects constituting the parent structural object and the other is a structural object arrangement data file 30b indicating the arrangement of the structural objects.

As shown in FIG. 3A, the structural object parent-child data file 30a is composed of a parent structural object ID column in which the identifier of a parent structural object is stored, a type column in which the structural object type of the parent structural object is stored, a child structural object check column in which whether or not the presence check of child structural objects is finished is stored, and a child structural object ID column in which the identifiers of the child structural objects are stored. For example, in the top row in FIG. 3A, the ID of the parent structural object is "N1D-012A-58", the type is "pipe assembly" that is a combination of pipe parts, the presence check of the child structural objects is "finished", and the child structural objects are composed of a straight pipe indicated by the ID "5L3G240-105-5" and an elbow pipe indicated by the ID "5L3G240-105-6". The type "module" is a structural object created by combining multiple pipe parts, apparatuses, and supports into a unit; in this example, it is a structural object created by combining a "pipe assembly" indicated by the ID "N1D-012A-58" and a "support" indicated by the ID "GT00001A". The type "in-area structural object" is a combination of all structural objects in an area; in this example, it is a combination of structural objects including the "module" indicated by the ID "TB1001M001".

As shown in FIG. 3B, the structural object arrangement data file 30b is composed of a structural object ID column in which the identifier of a structural object is stored, a type column in which the type of the structural object is stored, a size column in which the representative size of the structural object is stored, and a shape data column in which the coordinate values of the representative points of the structural object are stored. The structural object ID column contains only the ID of the minimum unit structural object of a structural object, such as a straight pipe that is a component of a pipe assembly or a cuboid that is a component of a support. The shape data column contains the coordinate values of the representative points of a structural object as described above. For example, when the structural object is a straight pipe or an elbow pipe, the central points, P0 and P1, of the ends of the pipe are representative points as shown in FIG. 5A and FIG. 5B and, when the structural object is a T pipe, the central points, P0, P1, and P2, of the three ends of the T pipe are representative points as shown in FIG. 5C. When the structural object is a cuboid, the four vertices, P0, P1, P2, and P3, of the cuboid are representative points as shown in FIG. 5D. The representative points are represented in the world coordinate system or, more specifically, by the coordinate values of a coordinate system whose origin is a point in the area in which the structural objects are actually installed.

The data of both the structural object parent-child data file 30a and the structural object arrangement data file 30b is created using three-dimensional CAD data obtained in the plant design stage.

As shown in FIG. 4, the tag arrangement data file 31 is composed of a structural object ID column in which the identifier of a structural object is stored, a tag ID column in which the identifier of the radio communication tag, which contains information on the structural object, is stored, a tag-attached child structural object ID column in which the identifier of a child structural object to which the tag is actually attached is stored, and an arrangement-on-structural-object column in which the coordinate values, which indicate the position of the radio communication tag of this child structural object in the proper coordinate system, are stored. For example, when one structural object is composed of multiple child structural objects, the ID of one of the child structural objects to which the tag is actually attached is stored in the tag-attached structural object ID column. If the radio communication tag of a structural object is attached, not to the structural object itself, but to a nearby structural object considering its attachment conditions, the ID of the nearby structural object is stored. The proper coordinate system of a structural object indicating the position of a radio communication tag is an xyz coordinate system with the representative point P0, which is one of the representative points P0, P1, . . . of the structural object, as its origin, as shown in FIGS. 5A-5D. The arrangement data of a radio communication tag is represented in the proper coordinate system of a structural object in this way. The reason is that the radio communication tag is attached in the initial stage of the life cycle (reception, processing, transport, installation, etc.) of the structural object and is continuously used in those processes and so, in the initial stage, it is difficult to determine the position where the structural object is to be installed. Therefore, the position of a radio communication tag is represented, not in the world coordinate system, but in the proper coordinate system of a structural object to which the radio communication tag is attached.

In case multiple radio communication tags are attached to one structural object, the same structural object ID is stored in multiple structural object ID columns with a unique tag ID stored for each structural object ID.

Next, the following describes the operation of the tag information reading support apparatus 10 in this embodiment.

This tag information reading support apparatus 10 can perform unread-tag check processing, correct read-position estimation processing, and structural object installation status check processing.

First, the following describes the unread-tag check processing with reference to the flowchart shown in FIG. 6.

The operator uses the tag information reader 3 to read information included in the multiple radio communication tags attached to a parent structural object such as a module. After that, the operator enters the ID of this parent structural object into the support apparatus 10. When the acceptance unit 21 of the support apparatus 10 accepts the ID of the parent structural object (S10), the tag list creation unit 22 extracts the IDs of all radio communication tags attached to the parent structural object with this ID to create an ID list of the radio communication tags (S11). To do so, the tag list creation unit 22 first references the parent-child data file 30a in the structural object data file 30 to extract the IDs of all child structural objects constituting the parent structural object with the accepted ID. If it is found, when extracting the IDs of the child structural objects, that an extracted child structural object is a parent structural object having multiple child structural objects, the tag list creation unit 22 further extracts a child structural object and repeats this extraction until finally the extracted child structural object is the minimum unit. Then, the tag list creation unit 22 references the tag arrangement data file 31 to extract the IDs of radio communication tags, each corresponding to an extracted child structural object that is a tag-attached child structural object, and creates an ID list of all extracted radio communication tags.

Next, the tag information acquisition unit 20 of the support apparatus 10 acquires the radio communication tag information from the tag information reader 3 (S12). Because the tag information reader 3 has already read the information included in the radio communication tags attached to the structural object such as a module as described above, it is possible to check the IDs of radio communication tags included in this tag information to determine which radio communication tags could actually be read. In the above description, it is assumed that the tag information includes the ID of the radio communication tag. If the tag information includes the ID of the structural object to which the radio communication tag is attached but does not include the ID of the radio communication tag, the tag information acquisition unit 20 references the tag arrangement data file 31 to find the tag ID corresponding to the acquired structural object ID. After acquiring the radio communication tag information from the tag information reader 3, the tag information acquisition unit 20 stores "finished" in the child structural object check column in the structural object parent-child data file 30a in FIG. 3A if the information is read from all radio communication tags attached to the child structural objects of the parent structural object.

Next, the unread tag extraction unit 23 checks the tag list, created in step S11, for the IDs of the radio communication tags that could be actually read and extracts the IDs of unchecked radio communication tags, that is, the IDs of unread radio communication tags (S13).

When the IDs of unread radio communication tags are extracted, the unread tag arrangement calculation unit 24 references the tag arrangement data file 31 to find the arrangement of each of the unread radio communication tags (S14). Because the coordinate values indicating the position of a radio communication tag stored in the tag arrangement data file 31 are represented in the proper coordinate system of the structural object to which the radio communication tag is attached, the unread tag arrangement calculation unit 24 converts the coordinate values in this proper coordinate system to those in the world coordinate system. At this time, the matrix a' indicating the coordinates of a tag in the world coordinate system is calculated by the following expression, $$a' = R \cdot a + T$$

where R is the rotation matrix for shifting the directions of the axes in the proper coordinate system to the directions of the axes in the world coordinate system, T is a parallel translation matrix for translating the coordinate system from the proper coordinate system to the world coordinate system, and a is the matrix indicating the coordinates of a tag in the proper coordinate system.

Figure 10:
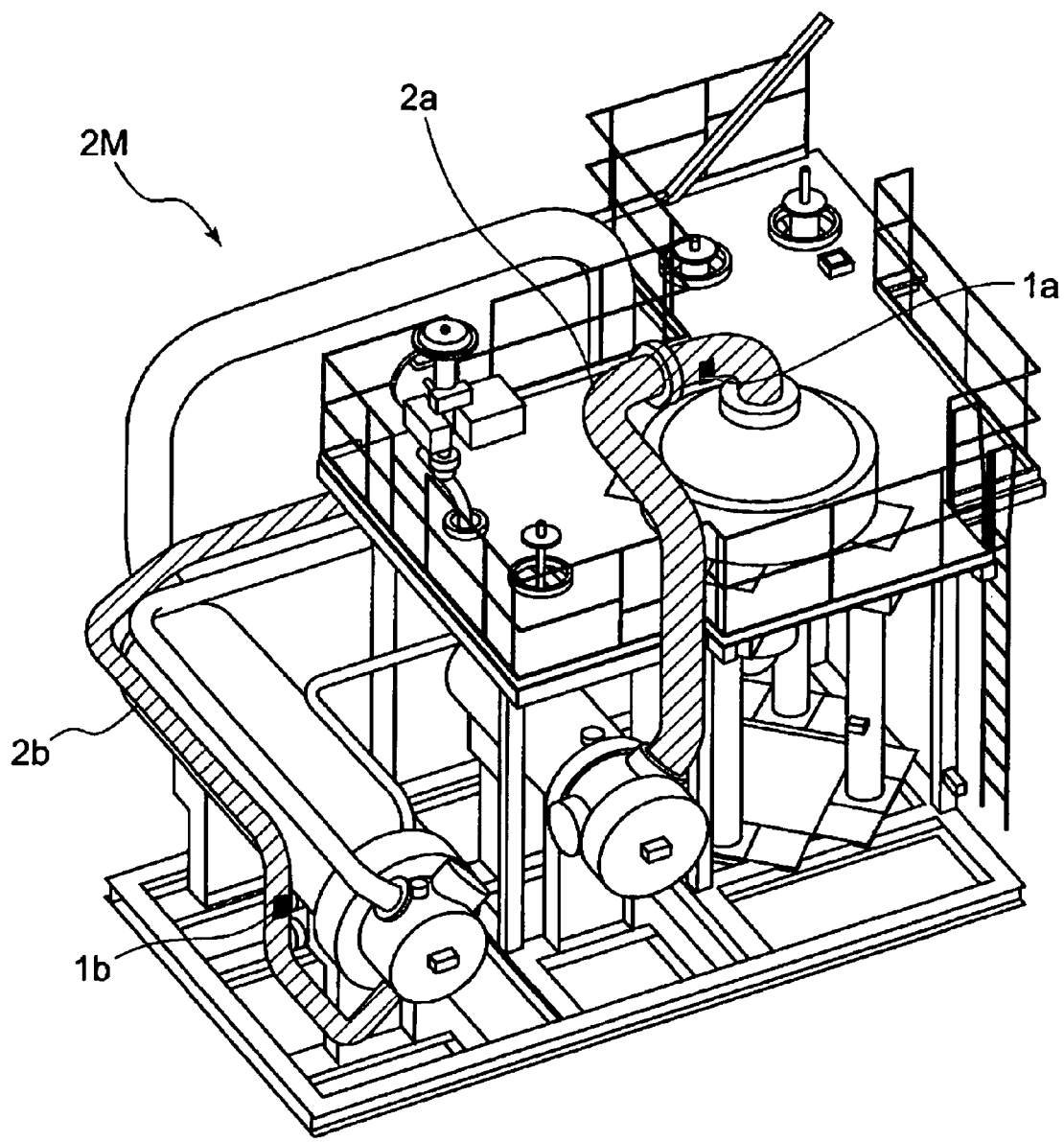
FIG. 10 is a diagram showing an example of the display of unread tag check processing result in one embodiment of the present invention.

After the unread tag arrangement calculation unit 24 calculates the arrangement of the unread radio communication tags, the display unit 29 displays the structural object (module) 2M, accepted in step S10, as shown in FIG. 10 and, at the same time, displays the unread radio communication tags 1a and 1b included in this structural object 2M (S15). In this display, it is desirable that the unread radio communication tags 1a and 1b and the structural objects 2a and 2b to which those unread radio communication tags are attached be distinguished from the read radio communication tags and the structural objects to which the read radio communication tags are attached, for example, by highlighting the unread radio communication tags 1a and 1b and the structural objects 2a and 2b to which the unread radio communication tags are attached or by translucently displaying the structural objects to which the read radio communication tags are attached. To display the structural object (module) 2M accepted in step S10, the three-dimensional CAD data prepared in advance is used.

As described above, the unread-tag check processing via the support apparatus 10 gives the operator the information as to whether there is an unread radio communication tag as well as its position. As a result, the operator can understand if the read position where the tag information reader reads a tag on the structural object, whose ID is entered in step S10, is improper or if an unread radio communication tag is attached in an improper position on the structural object.

Figure 7:
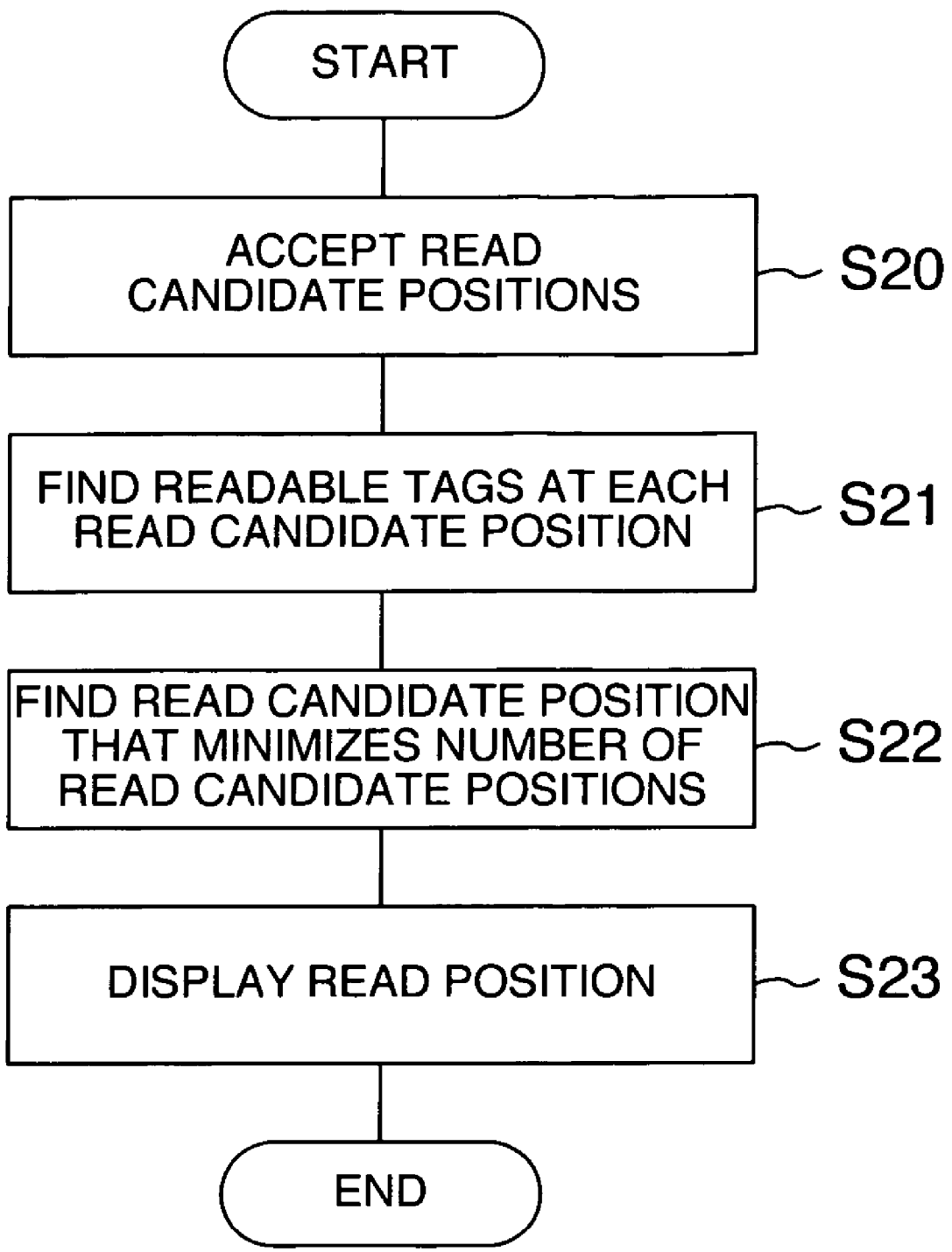
FIG. 7 is a flowchart showing the procedure of correct read-position estimation processing in one embodiment of the present invention.
Figure 8:
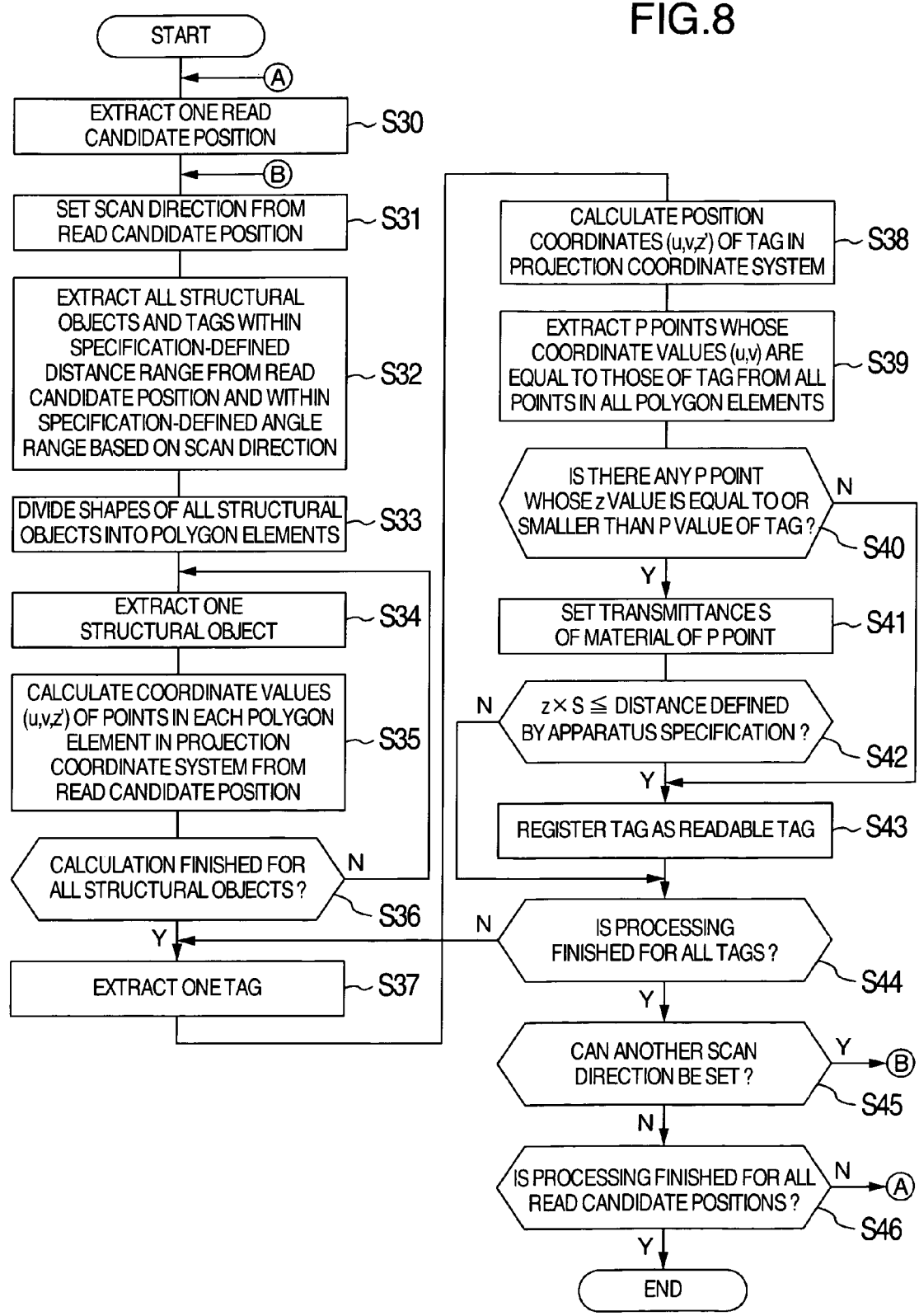
FIG. 8 is a flowchart showing the detailed processing contents of step S21 in the flowchart in FIG. 7.

Next, the following describes the correct read-position estimation processing with reference to the flowcharts shown in FIG. 7 and FIG. 8.

Figure 12:
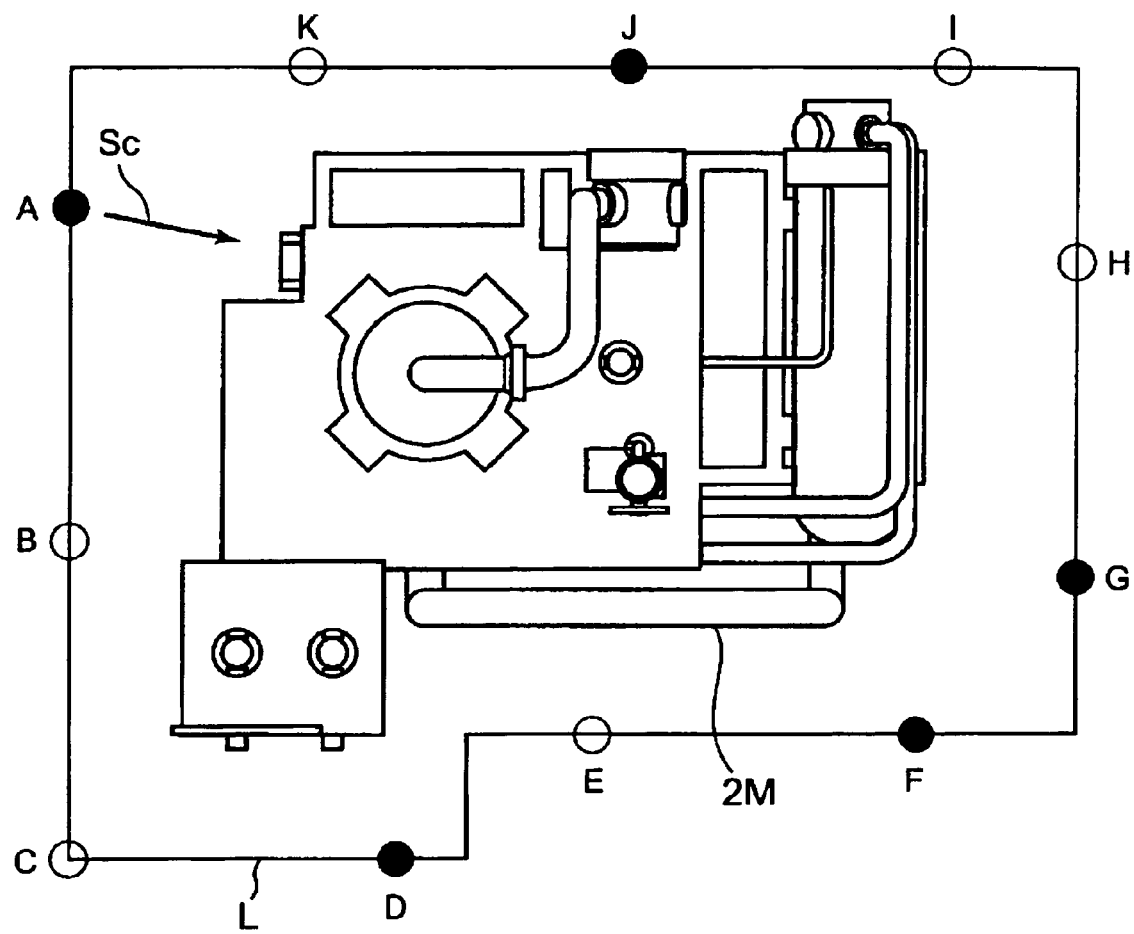
FIG. 12 is a diagram showing an example of the display of correct read-position estimation processing results in one embodiment of the present invention.

The operator enters the world coordinate values of several candidates for the positions at which information is read from multiple radio communication tags, attached to a structural object such as a module, by means of the tag information reader. When entering the read candidate positions, it is desirable to enter relatively more positions at relatively shorter intervals so that there is no radio communication tag cannot be read from any read candidate position. The acceptance unit 21 of the support apparatus 10 accepts multiple read candidate positions when the operator enters them (S20). Although the operator enters the actual coordinate values of the read candidate positions in the above example, it is also possible to request the operator to enter a movement path L, along which the read operation is performed, as shown in FIG. 12 and to divide the movement path L at a fixed distance interval for producing multiple division points that will be used as read candidate positions A, B, and so on. Alternatively, it is also possible to omit the operator' entry step, to use the periphery of the target structural object 2M as the movement path L along which the read operation is performed, and to divide the movement path L at a fixed distance for produce multiple division points that will be used as the read candidate positions A, B, and so on.

Next, the readable tag calculation unit 25 determines radio communication tags that can be read at each read candidate position by means of the tag information reader (S21).

With reference to the flowchart shown in FIG. 8, the following describes how the radio communication tags that can be read at each read candidate position are determined.

The readable tag calculation unit 25 extracts one of read candidate positions from those accepted in step S20 (S30). Next, the direction from the extracted read candidate position A to one of the centers (center of target structural object such as a module, center of multiple read candidate positions, and center of movement path during read operation) is set as the scan direction Sc (S31).

As described above, the tag information reader can wirelessly communicate with a radio communication tag within the distance range, and within the angle range, defined by the specification of this tag information reader. Therefore, the readable tag calculation unit 25 references the structural object data file 30 and the tag arrangement data file 31 to extract all structural objects and tags within the specification-defined distance range from the read candidate position extracted in step S30 and within the specification-defined angle range based on the scan direction (S32). Note that each of the structural objects extracted here is a minimum-unit child structural object.

Next, the shapes of all structural objects are divided into multiple triangular polygon elements (S33). In this case, if the surface shape of a structural object is a curved surface, for example, when the structural object is a cylinder, the surface shape is approximated to a plane shape as if the structural object was a polygon column before the structural object is divided into polygon elements.

Figure 11:
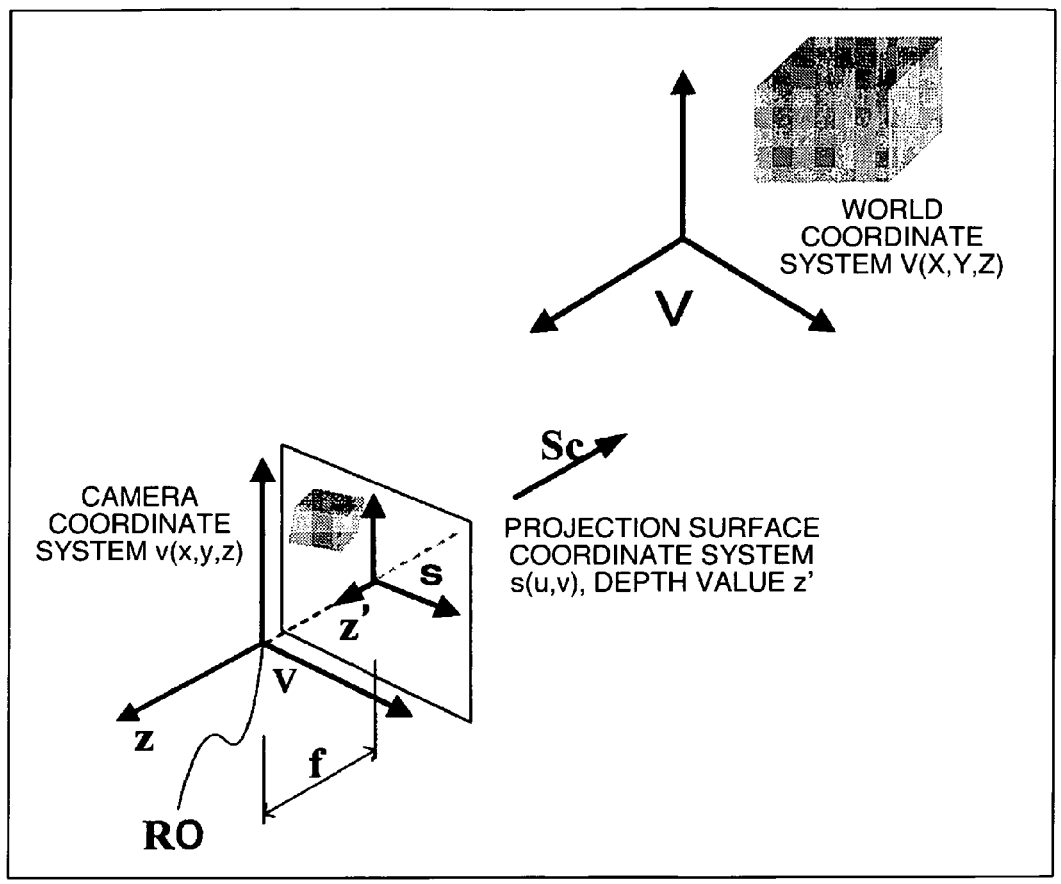
FIG. 11 is a diagram showing the relation among the world coordinate system, camera coordinate system, and projection surface coordinate system in one embodiment of the present invention.

Next, one structural object is extracted from all structural objects extracted in step S32 (S34), and the coordinate values of each point in each polygon element of the structural object are calculated in the projection coordinate system from the read candidate position (S35). In this case, in addition to the world coordinate system V and the projection coordinate system s, the camera coordinate system v is used to find the coordinate values of each point as shown in FIG. 11. In the camera coordinate system v, the read candidate position R0 is the origin, the scan direction Sc is the z-axis, and the axes perpendicular to each other in the plane perpendicular to the z axis are x-axis and y-axis. In the projection coordinate system s, the point that is away from the origin RO of the camera coordinate system v for the length equal to the projection focal length f in the scan direction Sc is the origin, the axis running through this origin and parallel to the x-axis of the camera coordinate system is the u-axis, the axis running through this origin and parallel to the y-axis of the camera coordinate system is the v-axis, and the scan direction Sc is the depth direction z'-axis.

Let V(X,Y,Z) be the coordinate values of one point in a polygon element in the world coordinate system, and let s(u,v) be the coordinate values of the same point in the polygon element in the projection coordinate system. The coordinate value conversion from the world coordinate system V to the projection coordinate system s is made by (Expression 1) given below. This conversion processing is performed for all points at a fixed interval in the triangular area of the polygon element.

$$u = \frac{P_{11}X + P_{12}Y + P_{13}Z + P_{14}}{P_{31}X + P_{32}Y + P_{33}Z + P_{34}}$$

$$v = \frac{P_{21}X + P_{22}Y + P_{23}Z + P_{24}}{P_{31}X + P_{32}Y + P_{33}Z + P_{34}}$$

Expression 1 where, pij is the ij element of the matrix P given below. f in the matrix A given below is the projection focal point length.

$$P = A\lfloor R^T | -R^T T \rfloor$$

$$A = \begin{bmatrix} f & 0 & 0 \\ 0 & f & 0 \\ 0 & 0 & 1 \end{bmatrix}$$

In (Expression 1), the matrix R is a rotation matrix for shifting the directions of the axes in the world coordinate system to the directions of the axes in the camera coordinate system, and the matrix T is a parallel translation matrix for translating the coordinate system from the world coordinate system to the camera coordinate system. $R^T$ is the transposed matrix of the matrix R.

Next, the world coordinate values of each vertex of the triangle of the polygon element are converted to the coordinate values in the projection coordinate system s. The values of u and v in the projection coordinate system s are calculated using (Expression 1) given above. The depth value z' in the projection coordinate system s is calculated as shown below. First, the conversion from the world coordinate system V to the camera coordinate system v is made by the following expression.

$$v = R^T V - R^T T$$

The z value in the camera coordinate system v calculated by the expression given above is converted to the depth value z' in the projection coordinate system s by the following expression.

$$z' = z - f$$

Next, the plane expression of the triangle of the polygon element in the projection coordinate system s determined. The plane in the projection coordinate system s is expressed by the expression given below. Thus, the constants a, b, and c in the plane expression are determined by substituting the coordinate values of the vertexes of the triangle of the polygon element, converted into the projection coordinate system s, into the plane expression given below.

$$u + av + bz' + c = 0$$

Next, the depth values z' of all points at a fixed interval in the triangle area are calculated by substituting the coordinate values (u, v) of all points at a fixed interval in the triangle area of the polygon element into the plane expression.

After calculating the coordinate values of each point in the polygon element in the projection coordinate system (S35), a check is made if the same processing is performed for each point in each polygon element of all structural objects (S36)

and, if the same processing is not yet performed for all structural objects, control is passed back to step S34 and, if the same processing is already performed for all structural objects, control is passed to step S37 to extract one radio communication tag from the multiple radio communication tags extracted in step S32.

After extracting one radio communication tag, the coordinate values in the world coordinate system of this radio communication tag are converted to the coordinate values in the projection coordinate system including the depth z (S38). This coordinate value conversion is basically the same as the processing in step S36 described above.

Next, P points each having the projection coordinate values (u, v) (except the depth value z') equal to those of the radio communication tag are extracted from the points in all polygon elements of all structural objects (S39). After that, a check is made if there is a P point whose depth value z' is smaller than the depth value z' of the radio communication tag (S40). If there is no such P point, this radio communication tag is registered in the readable tag management table as a readable tag judging that there is no obstacle between the read candidate position and the radio communication tag. As shown in FIG. 13, this readable tag management table is composed of a read candidate position column, a number of readable-tags column, and a readable tag ID column. When a readable radio communication tag is found, the readable tag calculation unit 25, which manages this table, stores the ID of the radio communication tag, which is found, in the readable tag ID column corresponding to the readable candidate position and adds "1" to the number of readable tags column corresponding to the read candidate position.

If it is determined in step S40 that there is such a P point, the transmittance S corresponding to the material of the structural object including the P point is set (S41), the depth value z' of the radio communication tag is multiplied by this transmittance S, and a check is made if the resulting value is equal to or smaller than the distance defined by the specification of the tag information reader (S42). If the value produced by multiplying the depth value z' of the radio communication tag by the transmittance S is equal to or smaller than the distance defined by the specification of the tag information reader, control is passed to step S43 described above and the radio communication tag is registered in the readable tag management table judging that the radio communication tag is readable.

After registering the readable tag (S43), a check is made if the processing in step S37 to step S43 is executed for all radio communication tags extracted in step S32 (S44) and, if the processing is not yet performed, control is passed back to step S37 and a new radio communication tag is extracted and, if the processing is performed for all radio communication tags, control is passed to step S45. If it is determined in step S42 that the value produced by multiplying the depth value z' of the radio communication tag by the transmittance S is larger than the distance defined by the tag information reader specification, the radio communication tag is determined unreadable and control is passed to step S44 without performing the registration processing (S43).

In step S45, a check is made if a scan direction Sc different from the scan direction Sc, which was set in step S31, can be set. In this step, a check is made if there is a radio communication tag within the reader-specification distance range from the read candidate position but outside the reader-specification angle range based on the scan direction Sc that was set in step S31. If such a radio communication tag is found, it is determined that a different scan direction Sc can be set. If it is determined that a different scan direction Sc can be set, control is passed back to step S31 and, in this step, the scan direction Sc is set in such a way that the radio communication tag, which is outside the reader-specification angle range based on the scan direction that was set in step S31 described above, falls within the reader-specification angle range. After that, steps S32 to step S45 are performed.

If it is determined in step S45 that a different scan direction Sc cannot be set, a check is made if the processing in step S30 to step S45 is performed for all read candidate positions accepted in step S20 described above. If the processing is not yet performed for all of them, control is passed back to step S30 to extract a new read candidate position; if the processing is already performed, the readable tag calculation processing (S21) is terminated.

The following describes the operation, again with reference to the flowchart in FIG. 7.

After the readable tag calculation processing (S21) described above is finished, the read position candidates are determined that minimize the number of read candidate positions (A, B, . . . ), entered in step S20, for reading all radio communication tags (S22). To do so, a reference is made to the readable tag management table shown in FIG. 13, and one or more combinations of multiple read candidate positions for reading all radio communication tags are extracted, and the combination that minimizes the number of read candidate positions is selected from those combinations. Although the combination of read candidate positions that minimizes the number of read candidate positions is selected in the description above, it is sometimes preferable in a specific area in the plant to select one read position candidate that maximizes the number of readable radio communication tags. With consideration for this requirement, it is better to prompt the operator to instruct which to select, either the read candidate position that minimizes the number of read candidate positions or one read position candidate that maximizes the number of readable radio communication tags, and to select one or both of them according to the instruction from the operator.

When the read position candidate that minimizes the number of read candidate positions (A, B, . . . ) is selected (S22), the readable tag calculation unit 25 passes the world coordinate values of this read position candidate to the display unit 29 that displays this read position candidate as the read position (S23). In this case, it is desirable that the read positions (A, D, F, . . . ) be displayed with the target structural object 2M as shown in FIG. 12 to make it easy for the operator to understand the relative position relation between the target structural object 2M and the read positions (A, D, F, . . . ). In this case, when all read candidate positions (A, B, C, . . . ) entered previously are displayed, it is desirable that the read candidate positions (A, D, F, . . . ) that are selected as the read positions be highlighted to allow the operator to distinguish between the read candidate positions (A, D, F, . . . ), which are selected from all read candidate positions (A, B, C, . . . ) as the read positions, and the read candidate positions (B, C, E, . . . ) that are not selected as the read positions.

As described above, the correct read-position estimation processing of the support apparatus 10 allows the operator to find the read positions at which information can be read efficiently from many radio communication tags in the plant.

Figure 9:
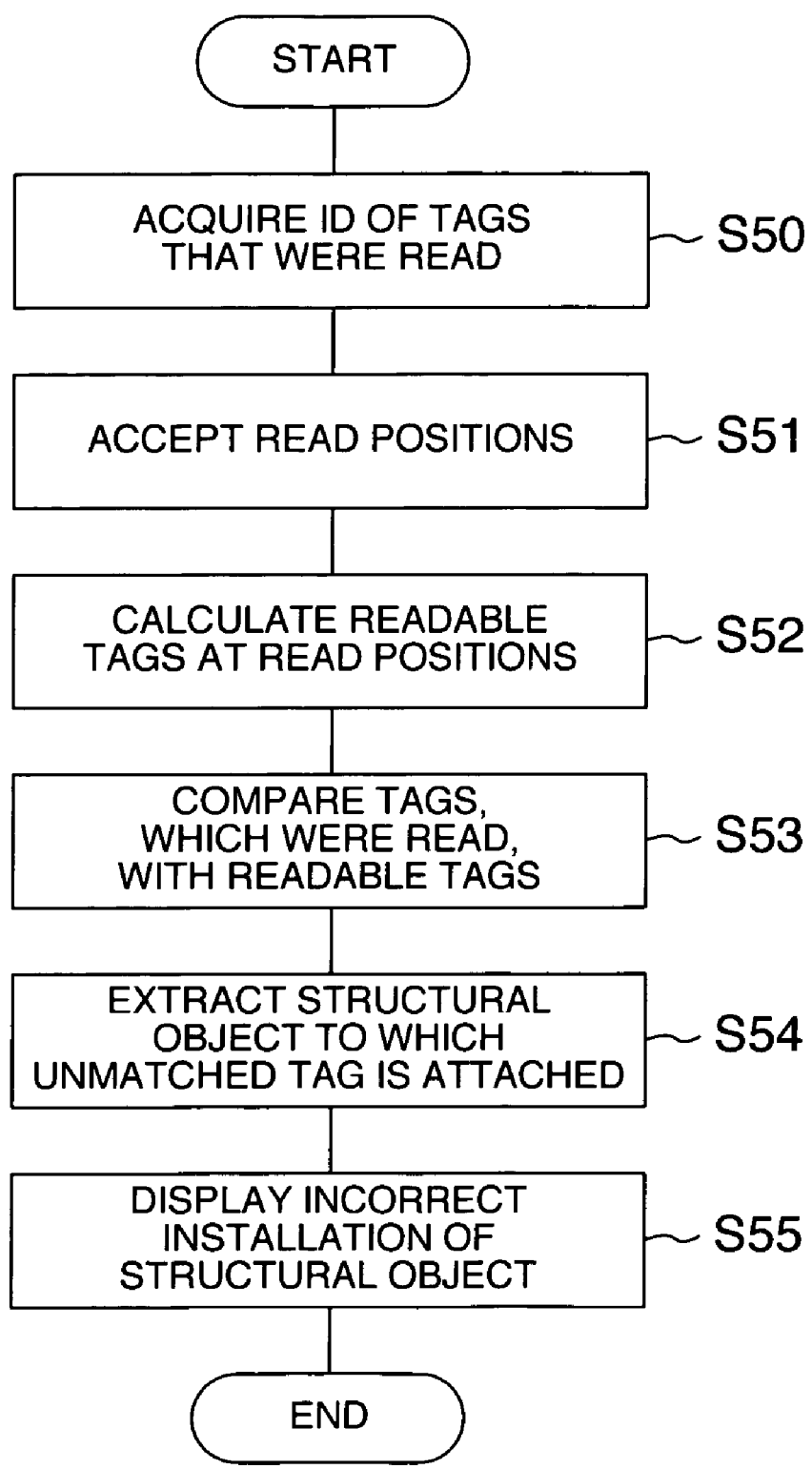
FIG. 9 is a flowchart showing the procedure of structural object installation status check processing in one embodiment of the present invention.

Next, the following describes the structural object installation status check processing with reference to the flowchart shown in FIG. 9.

First, the operator acquires information from radio communication tags at several read positions by means of the tag information reader 3. After that, the tag information acquisition unit 20 of the support apparatus 10 accepts the IDs of the radio communication tags, which were read, from the tag information reader 3 (S50). Next, the acceptance unit 21 accepts the read positions at which the information was actually read from the radio communication tags (S51).

Next, the readable tag calculation unit 25 acquires the readable radio communication tags at the read positions accepted in step S51 (S52). The method of the acquiring readable radio communication tags is basically the same as the method of acquiring the radio communication tags described with reference to FIG. 8.

Next, the comparison unit 27 compares the IDs of the radio communication tags actually read at the read positions with the IDs of the radio communication tags readable at the read positions obtained in step S52 and extracts an unmatched ID between the IDs of the radio communication tags actually read and the IDs of the readable radio communication tags (S53). A radio communication tag including an unmatched ID is found in one of the following two cases. In one case, a radio communication tag from which information could actually be read is not included in the readable radio communication tags and, in the other case, a radio communication tag from which information could not actually be read is included in the readable radio communication tags. Such a condition occurs when the structural object to which a radio communication tag, from which the information could actually be read, is an incorrect structural object or when the installation direction of the structural object is reversed. Therefore, extracting a radio communication tag including an unmatched ID helps to check the installation status of a structural object.

Next, the corresponding structural object extraction unit 28 references the tag arrangement data file 31 to extract the ID of the structural object to which the unmatched ID is attached and, at the same time, references the structural object arrangement data file 3b to acquire the world coordinate values of this structural object (S54). The corresponding structural object extraction unit 28 notifies the acquired world coordinate values of the structural object to the display unit 29 which displays this structural object as an incorrectly installed structural object (S55). When this information is displayed, it is desirable, as in the display example in FIG. 10, that the incorrectly installed structural object and the parent structural object including this structural object be displayed with the incorrectly installed child structural object highlighted to allow the operator to distinguish between the incorrectly installed child structural object and the correctly installed child structural objects.

As described above, the structural object installation status check processing via the support apparatus 10 allows the operator to quickly and easily check the installation status of many structural objects in a plant.

When the read positions at which information was actually read from radio communication tags are accepted in step S51, it is assumed in the above description that the operator enters the coordinate values of the read positions via the keyboard. It is also possible to acquire radio communication tag information as well as the read positions from the tag information reader 3.

Figure 14:
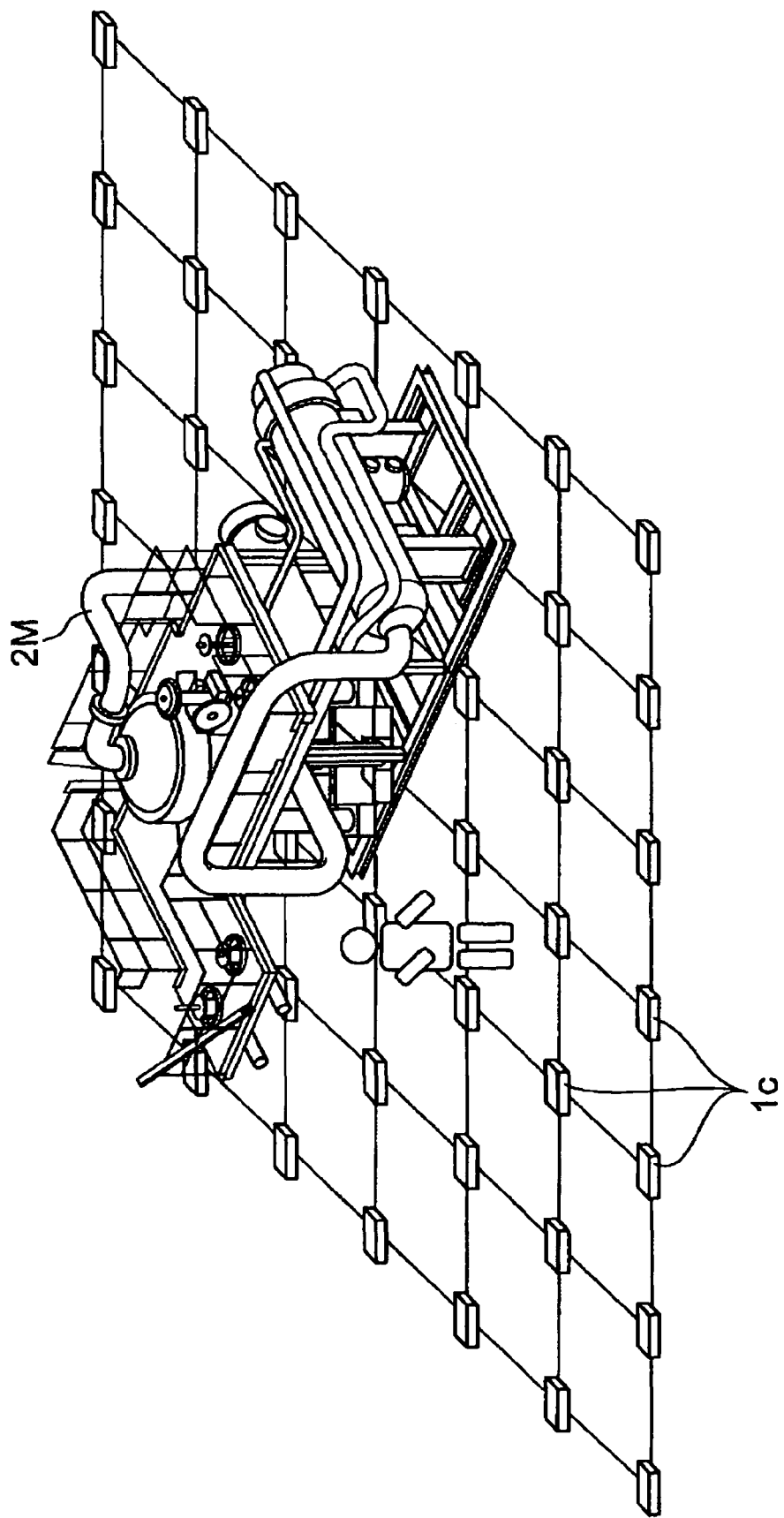
FIG. 14 is a diagram showing the arrangement of position detection radio communication tags in one embodiment of the present invention.

To do so, multiple position detection radio communication tags, (1c, 1c, ...) are arranged in advance on a grid as shown in FIG. 14 in the installation area where the target structural object 2M is installed. In addition, the IDs of the multiple position detection radio communication tags 1c, as well as the world coordinate values of the tags, are stored in the tag information reader in advance. And, when reading information from the radio communication tags attached to the structural objects, the tag information reader wirelessly communicates also with the multiple position detection radio communication tags. During the wireless communication with those multiple position detection radio communication tags, the tag information reader acquires the IDs of the position detection radio communication tags with which it can communicate, calculates the world coordinate values of those position detection radio communication tags and, in addition, calculates the distance from the position detection radio communication tags to the tag information reader based on the intensity of the radio wave received from the position detection radio communication tags with which it can communicate. The tag information reader uses the world coordinate values of the multiple position detection radio communication tags with which it can communicate and the distance from the position detection radio communication tags to the tag information reader to calculate the position of the tag information reader itself and uses the calculated position as the read position.

It should be further understood by those skilled in the art that although the foregoing description has been made on embodiments of the present invention, the present invention is not limited thereto and various changes and modification may be made without departing from the spirit of the present invention and the scope of the appended claims.

The invention claimed is:

1. A tag information reading support apparatus that supports a tag information reader to read information from radio communication tags attached to each of a plurality of items, comprising:
   tag arrangement data storage means in which information on an arrangement of each of the radio communication tags, attached to each of the plurality of items, is stored;
   tag information acquisition means that acquires information on the radio communication tags, attached to each of the plurality of items, from said tag information reader;
   unread tag extraction means that extracts one or more radio communication tags from the plurality of radio communication tags which are stored in said tag arrangement data storage means but from which information could not be acquired by said tag information acquisition means;
   tag arrangement data extraction means that extracts information on an arrangement of said one or more radio communication tags, extracted by said unread tag extraction means, from said tag arrangement data storage means;
   output means that outputs information on the arrangement of the radio communication tags extracted by said tag arrangement data extraction means; and
   a target item acceptance means that accepts a specification of one or more items which are among the plurality of items and to which the radio communication tags, from which said tag information reader reads information, are attached,
   wherein said unread tag extraction means extracts one or more radio communication tags which are among the plurality of radio communication tags stored in a tag arrangement data storage area and which are attached to one or more items accepted in said target item acceptance means but from which information cannot be acquired in said tag information acquisition means.

2. A non-transitory computer-readable medium embodying a tag information reading support program that supports a tag information reader to read information from radio communication tags attached to each of a plurality of items, said program causing a computer to execute:

a tag information acquisition step that acquires information on the radio communication tags, attached to each of the plurality of items, from said tag information reader;

an unread tag extraction step that extracts one or more radio communication tags from said plurality of radio communication tags of which arrangement information is stored in a tag arrangement data storage area but from which information could not be acquired in said tag information acquisition step;

a tag arrangement data extraction step that extracts information on an arrangement of said one or more radio communication tags, extracted in said unread tag extraction step, from said tag arrangement data storage area;

an output step that outputs information on the arrangement of the radio communication tags extracted in said tag arrangement data extraction step; and a target item acceptance step that accepts a specification of one or more items which are among the plurality of items and to which the radio communication tags, from which said tag information reader reads information, are attached, wherein said unread tag extraction step extracts one or more radio communication tags which are among the plurality of radio communication tags stored in said tag arrangement data storage area and which are attached to one or more items accepted in said target item acceptance step but from which information cannot be acquired in said tag information acquisition step.

3. A tag information reading support method that supports a tag information reader to read information from radio communication tags attached to each of a plurality of items, comprising:

a step of storing, in advance, information on an arrangement of each of the radio communication tags, attached to each of the plurality of items, in a storage area;

a tag information acquisition step that acquires information on the radio communication tags, attached to each of the plurality of items, from said tag information reader;

an unread tag extraction step that extracts one or more radio communication tags from the plurality of radio communication tags which are stored in said storage area but from which information could not be acquired in said tag information acquisition step;

a tag arrangement data extraction step that extracts information on an arrangement of said one or more radio communication tags, extracted in said unread tag extraction step, from said storage area;

an output step that outputs information on the arrangement of the radio communication tags extracted in said tag arrangement data extraction step; and a target item acceptance step that accepts a specification of one or more items which are among the plurality of items and to which the radio communication tags, from which said tag information reader reads information, are attached, wherein said unread tag extraction step extracts one or more radio communication tags which are among the plurality of radio communication tags stored in said storage area and which are attached to one or more items accepted in said target item acceptance step but from which information cannot be acquired in said tag information acquisition step.

* * * * *